United States Patent [19]

Kershaw

[11] 3,775,258
[45] Nov. 27, 1973

[54] PURIFICATION OF ADIPONITRILE
[75] Inventor: Bernard John Kershaw, Kingston, Ontario, Canada
[73] Assignee: Du Pont of Canada Limited, Montreal, Quebec, Canada
[22] Filed: Apr. 27, 1972
[21] Appl. No.: 248,079

[52] U.S. Cl.............. 203/29, 203/35, 203/36, 260/464, 260/465.2, 260/465.8 R
[51] Int. Cl............................................. B01d 3/34
[58] Field of Search............. 260/465.8, 464, 465.2; 203/29, 35, 36

[56] References Cited
UNITED STATES PATENTS

| 2,711,991 | 6/1955 | Hrubesch et al................ 203/35 |
| 2,920,099 | 1/1960 | Ringwald.................. 260/465.8 R |
| 2,144,340 | 1/1939 | Lazier........................ 260/465.2 |
| 3,496,212 | 2/1970 | Davison et al................. 260/465.2 |
| 2,768,132 | 10/1956 | Halliwell................. 260/465.8 UX |
| 2,305,103 | 12/1942 | Osgood........................... 260/464 |

FOREIGN PATENTS OR APPLICATIONS

| 1,094,908 | 12/1967 | Great Britain.......... 260/465.8 R |
| 731,458 | 6/1955 | Great Britain.......... 260/465.8 R |

Primary Examiner—Joseph P. Brust
Attorney—William A. Hoffman

[57] ABSTRACT

A process is provided for hydrolyzing 2-cyanocyclopentylideneimine (CPI) to 2-cyanocyclopentanone by contacting the CPI with an acidic catalyst and water at a temperature of at least 140° C. Preferred catalysts are silica-alumina, crystalline aluminosilicates, boron phosphate and titania-alumina. The process is particularly useful in the separation of CPI impurity from hexamethylenediamine.

5 Claims, No Drawings

PURIFICATION OF ADIPONITRILE

BACKGROUND OF THE INVENTION

The present invention relates to an improved process for the hydrolysis of 2-cyanocyclopentylideneimine, hereinafter sometimes referred to as CPI. In particular, this invention relates to an improved process for the purification of adiponitrile comprising the hydrolysis of CPI and the separation of adiponitrile so purified.

One of the more important uses of adiponitrile at the present time is in the preparation of hexamethylene diamine. This diamine may be used as a detergent, as an emulsifying agent or as an intermediate in the preparation of polymers. A catalytic hydrogenation reaction is usually employed to convert adiponitrile to hexamethylene diamine.

There are several methods for synthesizing adiponitrile such as the processes of U.S. Pat. No. 2,200,734 issued to Arnold and Lazier on May, 14th 1940 in which adipic acid is treated with ammonia in the presence of a dehydrating catalyst, and U.S. Pat. No. 2,532,311 issued to Howk and Farlow on Dec. 5th 1950 in which dicyanobutene is catalytically hydrogenated. The products of these reactions contain impurities, some of which boil at temperatures close to the boiling point of adiponitrile, CPI is an example of this type of impurity. Such close boiling impurities cannot be removed efficiently in industrial scale distillation columns. Impurities in the adiponitrile may lead to impurities in subsequent derivatives, in particular in hexamethylene diamine, that are difficult to remove. Failure to remove these latter impurities may result in inferior and variable product properties, especially of derived polymers.

Techniques for the purification of adiponitrile, especially adiponitrile containing CPI, are known in the art. In British Pat. No. 731,458 the treatment of adiponitrile with acids such as sulphuric, hydrochloric, hydrobromic, formic, chlorinated carboxylic acids, tartaric, oxalic, succinic, adipic, benzoic, salicylic, phthalic, terephthalic, benzene-or toluene-sulphonic acids and propane-1,3, disulphonic acid is disclosed. The use of nitric acid is disclosed in Canadian Pat. No. 614,671. Aqueous formaldehyde, as is disclosed in German Pat. No. 928,406, and polymers of formaldehyde such as is disclosed in the copending application Ser. No. 095,669 of M. G. Pounder and K. R. Wilkins, may also be used. Other techniques are also known in the art. The processes known in the art are relatively expensive, and in those cases where adiponitrile is treated with an acid, the acid may be neutralized by ammonia produced during the treatment steps.

STATEMENT OF INVENTION

It has now been found that CPI may be hydrolyzed to 2-cyanocyclopentanone in high yield by contacting CPI with a solid acidic catalyst in the presence of water.

Accordingly, the present invention provides a process for the hydrolysis of 2-cyanocyclopentylideneimine comprising the step of contacting 2-cyanocyclopentylideneimine with a solid acidic catalyst in the presence of water and act a temperature of at least 140° C.

In a preferred embodiment the present invention provides a process for the hydrolysis of 2-cyanocyclopentylideneimine comprising the step of contacting 2-cyanocyclopentylideneimine with a solid acidic catalyst in the presence of water and at a temperature of at least about 140° C., said catalyst being selected from the group consisting of silica-alumina catalysts, crystalline aluminosilicates, boron phosphate and titania-alumina.

The present invention also provides a process for the removal of 2-cyanocyclopentylideneimine from adiponitrile comprising the steps of contacting said adiponitrile with a solid acidic catalyst in the presence of water and at a temperature of at least 140° C., said catalyst being selected from the group consisting of silica-alumina catalysts, crystalline aluminosilicates, boron phosphate and titania-alumina, and separating adiponitrile.

As disclosed hereinabove CPI may be hydrolysed to 2-cyanocyclopentanone by contacting CPI with a solid acidic catalyst in the presence of water at a temperature of at least about 140° C. The use of a catalyst that is solid under the reaction conditions permits the use of fixed-bed operations in which the reaction mixture comprising CPI and water is passed through the catalyst in the fixed bed. The operation of such processes is known to those skilled in the art. In addition, solid catalysts may be used in slurry operations as this simplifies catalyst removal processes. The operation of slurry reactions is also known to those skilled in the art.

Suitable catalysts for the process of the present invention are solid acidic catalysts such as silica-alumina catalysts, crystalline aluminosilicates, boron phosphate, titania-alumina, alumina-boria catalysts and the naturally occurring acidic clays. The preferred catalysts are silica-alumina catalysts, crystalline aluminosilicates, boron phosphate and titania-alumina. The catalysts may be modified by treatment with acids such as phosphoric and acetic acids, an example of this type of catalyst being boron phosphate containing 10% phosphoric acid.

Water is essential to the process of the present invention. The minimum amount of water required is the stoichiometric amount required for the hydrolysis of CPI to 2-cyanocyclopentanone, while the upper limit on the amount of water present is primarily determined by the economics of water removal after the process has been carried out. For adiponitrile containing relatively small amounts of CPI impurity, in the order of 4,000 ppm as illustrated in the Examples, a suitable operating range is 1 to 10 weight percent of water based on the weight of adiponitrile.

The process is preferably carried out at a temperature of at least about 140° C. The upper temperature limit is mainly determined by the decomposition of the compounds present in the reaction mixture, especially the decomposition of adiponitrile during the purification of adiponitrile. The preferred temperature range is 190° to 210° C.

The process may be operated at pressures from atmospheric pressure to about 15 atmospheres. The preferred pressure range is 3 to 5 atmospheres.

The rate of treatment of the CPI may depend on the temperature, pressure, composition of the solution being treated, the type and mesh size of the catalyst, the time of contact of the solution with the catalyst, and the concentration of water.

In a preferred embodiment the present invention may be used in the purification of adiponitrile. Adiponitrile containing CPI may be treated by the process of the present invention to hydrolyse the CPI. Subsequently, purified adiponitrile may be obtained from the adiponitrile so treated by techniques known in the art, such as by distillation.

It is preferrred that the solutions contacted with the catalyst contain only low concentrations of impurities that are detrimental to the efficiency of the catalyst employed. The catalysts used may frequently be regenerated by the high temperature oxidation of adsorbed impurities.

DESCRIPTION OF PREFERRED EMBODIMENTS

The invention is illustrated by the following examples.

EXAMPLE 1

Using a slurry reaction system, adiponitrile containing 4,000 ppm of CPI and added water was heated under pressure. Details of the experimental conditions and results are given in the Table I. All analyses were carried out by gas chromatography, the error being about ± 10%. The silica-alumina catalyst was Silica-Alumina 979 of mesh size 50/60 which is obtainable from W. R. Grace. The boron phosphate catalyst was a fine powder obtained from Ceramic Color and Chemical Manufacturing Co.

TABLE I

|  | Run 1 | Run 2 | Run 3 |
|---|---|---|---|
| Concentration of water (%) | 5 | 5 | 5 |
| Catalyst type | silica-alumina | boron phosphate | silica-alumina |
| Catalyst concentration (%) | 2 | 1 | 1 |
| Reaction temperature (°C) | 200 | 200 | 190 |
| Reaction pressure (atmos.) | 2 | 2 | 2 |
| Feed rate (g/hour) | 100 | 100 | 100 |
| CPI in product (ppm) | 960 | 1760 | 970 |
| CCPK* in product (ppm) | 3090 | 2510 | 2740 |

*2-cyanocyclopentanone

EXAMPLE 2

In a fixed bed reactor, adiponitrile containing 4,000 ppm of CPI and added water was heated under pressure. Details of the experimental conditions are given in Table II.

TABLE II

|  | Run 4 | Run 5 |
|---|---|---|
| Concentration of water (%) | 5 | 5 |
| Catalyst type | silica-alumina | silica-alumina |
| Catalyst weight (g) | 2.05 | 3.95 |
| Reaction temperature (°C) | 210 | 190 |
| Reaction pressure**(atmos) inlet | 3 | 3 |
| exit | 1 | 1 |
| Feed rate (g/hr) | 210 | 420 |
| CPI in product (ppm) | 1050 | 500 |
| CCPK* in product (ppm) | 2750 | 3050 |

* 2-cyanocyclopentanone
**pressure decreased across reactor

EXAMPLE 3

300 mm of a tubular reactor of 4.57 mm internal diameter and 1,000 mm in length was packed with Silica Alumina 979 of 60/80 mesh size which is obtainable from W. R. Grace. Adiponitrile containing 4,000 ppm of CPI and 5 weight percent of water was preheated to the reactor temperature and fed to the reactor at 210 g/hour. At a reaction temperature of 190° C. the CPI concentration of the product was 1,200 ppm; when the temperature was raised to 210° C. the CPI concentration of the product was 1,050 ppm.

EXAMPLE 4

A tubular reactor of internal diameter 17.3 mm and 2,000 mm in length was filled in the 16/20 mesh Silica Alumina 979 which is obtainable from W. R. Grace. Adiponitrile containing 4,000 ppm of CPI and 5 weight percent of water was passed through the reactor at a rate of 8,000 g/hour at a reaction temperature of 200° C. The CPI concentration of the product was 525 ppm. The adiponitrile is separated from the 2-cyanocyclopentanone by fractional distillation

I claim:

1. A process for the removal of 2-cyanocyclopentylideneimine from adiponitrile which comprises the steps of contacting adiponitrile containing low concentrations of 2-cyanocyclopentylideneimine with a solid acid catalyst of the group consisting of silica-alumina, crystalline aluminosilicate, boron phosphate, titania-alumina, alumina-boria and natural occurring acidic clay, in the presence of water in at least the stoichiometric amount required to hydrolyze 2-cyanocyclopentylideneimine to 2-cyanocyclopentanone, at a temperature in the range of 140° C. to 210° C., at a pressure in the range of 1 to about 15 atmospheres, whereby to hydrolyze the 2-cyanocyclopentylideneimine to 2-cyanocyclopentanone, and separating the adiponitrile from the 2-cyanocyclopentanone.

2. The process of claim 1 wherein the adiponitrile contains 1 to 10 percent by weight of water and the pressure is in the range of 3 to 5 atmospheres.

3. The process of claim 2 wherein the temperature is in the range of 190° to 210° C.

4. The process of claim 1 wherein the catalyst contains an acid of the group consisting of acetic and phosphoric acid.

5. The process of claim 4 wherein the catalyst is boron phosphate which contains phosphoric acid.

* * * * *

UNITED STATES PATENT OFFICE
CERTIFICATE OF CORRECTION

Patent No. 3,775,258      Dated November 27, 1973

Inventor(s) Bernard John Kershaw

It is certified that error appears in the above-identified patent and that said Letters Patent are hereby corrected as shown below:

On the cover page, after "[21] Appl. No.: 248,079",
insert --[30] Foreign Application Priority Data
        May 21, 1971   Canada . . . . .113,713--

Signed and sealed this 29th day of October 1974.

(SEAL)
Attest:

McCOY M. GIBSON JR.         C. MARSHALL DANN
Attesting Officer           Commissioner of Patents